(12) United States Patent
Allen

(10) Patent No.: US 7,882,616 B1
(45) Date of Patent: Feb. 8, 2011

(54) MANUFACTURING SINGLE-SIDED STORAGE MEDIA

(75) Inventor: Joseph Allen, San Carlos, CA (US)

(73) Assignee: Seagate Technology LLC, Scotts Valley, CA (US)

(*) Notice: Subject to any disclaimer, the term of this patent is extended or adjusted under 35 U.S.C. 154(b) by 904 days.

(21) Appl. No.: 11/215,207

(22) Filed: Aug. 29, 2005

Related U.S. Application Data

(60) Provisional application No. 60/606,847, filed on Sep. 2, 2004.

(51) Int. Cl.
G11B 5/127 (2006.01)
H04R 31/00 (2006.01)

(52) U.S. Cl. ............. 29/603.03; 29/603.04; 29/603.06; 29/603.07; 206/710; 206/711; 206/712; 206/454; 360/135; 414/404; 414/811; 451/5; 451/41

(58) Field of Classification Search ............. 29/603.03, 29/603.04, 603.06; 206/710–712, 454; 360/135; 414/404, 811; 451/5, 41
See application file for complete search history.

(56) References Cited

U.S. PATENT DOCUMENTS

| | | | |
|---|---|---|---|
| 3,382,647 A | 5/1968 | Davey et al. | |
| 3,505,777 A | 4/1970 | Tsutsumi | |
| 4,573,851 A | 3/1986 | Butler | |
| 4,669,612 A | 6/1987 | Mortensen | |
| 4,676,008 A | 6/1987 | Armstrong | |
| 4,694,778 A | 9/1987 | Learn et al. | |
| 4,695,217 A | 9/1987 | Lau | |
| 4,724,963 A | 2/1988 | Mortensen | |
| 4,768,328 A | 9/1988 | Mims | |
| 4,808,456 A | 2/1989 | Yamada et al. | |
| 4,819,579 A | 4/1989 | Jenkins | |
| 4,840,530 A | 6/1989 | Nguyen | |
| 4,856,957 A | 8/1989 | Lau et al. | |
| 4,939,891 A | 7/1990 | Podini | |

(Continued)

FOREIGN PATENT DOCUMENTS

EP 0 177 073 8/1985

(Continued)

OTHER PUBLICATIONS

Pang, S.I. et al., "Effects of Nitrogenated NiP Seedlayer on Co-Alloy Thin Film Media," 1494-96, IEEE Transactions on Magnetics, vol. 37, No. 4, (Jul. 2001).

(Continued)

*Primary Examiner*—Paul D Kim

(57) ABSTRACT

In one embodiment, a method can include providing first and second intermediate structures, each having first and second surfaces. Also, the method can include placing the first surface of the first intermediate structure adjacent to the first surface of the second intermediate structure, such that the first and second intermediate structures are in a stacked relationship. Additionally, the method can include simultaneously removing at least a portion of each of the second surfaces of the first and second intermediate structures while in the stacked relationship. Furthermore, the method can include forming a plating layer on each of the first and second surfaces of each of the first and second intermediate structures. Moreover, the method can include forming a magnetic layer on the second surface but not the first surface of each of the first and second intermediate structures.

19 Claims, 7 Drawing Sheets

U.S. PATENT DOCUMENTS

| | | | |
|---|---|---|---|
| 4,947,624 A | 8/1990 | Cones, Sr. et al. |
| 4,947,784 A | 8/1990 | Nishi |
| 4,949,848 A | 8/1990 | Kos |
| 4,958,982 A | 9/1990 | Champet et al. |
| 4,962,879 A | 10/1990 | Goesele et al. |
| 4,981,222 A | 1/1991 | Lee |
| 4,987,407 A | 1/1991 | Lee |
| 5,007,788 A | 4/1991 | Asano et al. |
| 5,111,936 A | 5/1992 | Kos |
| 5,125,784 A | 6/1992 | Asano |
| 5,188,499 A | 2/1993 | Tarng et al. |
| 5,250,339 A | 10/1993 | Tani et al. |
| 5,269,643 A | 12/1993 | Kodama et al. |
| 5,314,107 A | 5/1994 | D'Aragona et al. |
| 5,339,204 A | 8/1994 | James et al. |
| 5,348,151 A | 9/1994 | Dressen |
| 5,351,156 A | 9/1994 | Gregory et al. |
| 5,430,992 A | 7/1995 | Olson |
| 5,476,176 A | 12/1995 | Gregerson et al. |
| 5,478,622 A | 12/1995 | Nakamura et al. |
| 5,480,695 A | 1/1996 | Tenhover et al. |
| 5,486,134 A | 1/1996 | Jones et al. |
| 5,497,085 A | 3/1996 | Tian et al. |
| 5,501,568 A | 3/1996 | Ono |
| 5,612,830 A | 3/1997 | Gregory et al. |
| 5,620,295 A | 4/1997 | Nishi |
| 5,664,407 A | 9/1997 | Cooper, III et al. |
| 5,665,478 A | 9/1997 | Suzuki et al. |
| 5,773,124 A | 6/1998 | Ishikawa et al. |
| 5,780,127 A | 7/1998 | Mikkelsen |
| 5,820,449 A | 10/1998 | Clover |
| 5,906,469 A | 5/1999 | Oka et al. |
| 5,926,352 A | 7/1999 | Murayama et al. |
| 5,928,759 A | 7/1999 | Arita et al. |
| 5,956,317 A | 9/1999 | Komiyama et al. |
| 5,976,255 A | 11/1999 | Takaki et al. |
| 5,991,104 A | 11/1999 | Bonyhard |
| 6,007,896 A | 12/1999 | Bhushan |
| 6,033,486 A | 3/2000 | Andros |
| 6,033,522 A | 3/2000 | Iwata et al. |
| 6,086,961 A | 7/2000 | Bonyhard |
| 6,107,599 A | 8/2000 | Baumgart et al. |
| 6,117,570 A | 9/2000 | Chen et al. |
| 6,120,890 A | 9/2000 | Chen et al. |
| 6,150,015 A | 11/2000 | Bertero et al. |
| 6,182,814 B1 | 2/2001 | Koehler |
| 6,340,090 B1 | 1/2002 | Jahani et al. |
| 6,345,947 B1 | 2/2002 | Egashira |
| 6,354,794 B2 | 3/2002 | Sato et al. |
| 6,368,040 B1 | 4/2002 | Yamasaki et al. |
| 6,427,850 B2 | 8/2002 | Mendiola |
| 6,457,929 B2 | 10/2002 | Sato et al. |
| 6,498,086 B1 | 12/2002 | Zheng |
| 6,582,279 B1 | 6/2003 | Fox et al. |
| 6,595,028 B1 | 7/2003 | Miyamoto et al. |
| 6,596,083 B2 | 7/2003 | Cromwell et al. |
| 6,612,801 B1 | 9/2003 | Koguchi |
| 6,625,835 B1 | 9/2003 | Frost et al. |
| 6,626,744 B1 | 9/2003 | White et al. |
| 6,664,503 B1 | 12/2003 | Hsieh et al. |
| 6,769,855 B2 | 8/2004 | Yokomori et al. |
| 6,818,331 B2 | 11/2004 | Sakawaki et al. |
| 6,821,653 B2 | 11/2004 | Fukushima et al. |
| 6,926,977 B2 | 8/2005 | Osawa et al. |
| 6,942,933 B2 | 9/2005 | Osawa |
| 7,027,246 B2 | 4/2006 | Valeri |
| 7,052,739 B2 | 5/2006 | Buitron et al. |
| 7,322,098 B2 * | 1/2008 | Buitron et al. ............ 29/604 |
| 2001/0049031 A1 | 12/2001 | Bajorek et al. |
| 2001/0053444 A1 | 12/2001 | Yokoyama et al. |
| 2002/0006324 A1 | 1/2002 | Sato et al. |
| 2002/0054976 A1 | 5/2002 | Nakamura et al. |
| 2002/0055017 A1 | 5/2002 | Fukushima et al. |
| 2002/0081181 A1 | 6/2002 | Yokomori et al. |
| 2002/0132043 A1 | 9/2002 | Cromwell et al. |
| 2002/0142707 A1 | 10/2002 | Shimada et al. |
| 2002/0159177 A1 | 10/2002 | Aoki et al. |
| 2003/0082407 A1 | 5/2003 | Sakawaki et al. |
| 2003/0104253 A1 | 6/2003 | Osawa et al. |
| 2003/0179692 A1 | 9/2003 | Ohotomo |
| 2003/0194464 A1 | 10/2003 | Iida et al. |
| 2003/0208899 A1 | 11/2003 | Grow et al. |
| 2003/0209389 A1 | 11/2003 | Buitron et al. |
| 2003/0209421 A1 | 11/2003 | Buitron et al. |
| 2003/0210498 A1 | 11/2003 | Kim et al. |
| 2003/0211275 A1 | 11/2003 | Buitron et al. |
| 2003/0211361 A1 | 11/2003 | Kim et al. |
| 2004/0005481 A1 | 1/2004 | Osawa |
| 2004/0013011 A1 | 1/2004 | Valeri |
| 2004/0016214 A1 | 1/2004 | Buitron |
| 2004/0023073 A1 | 2/2004 | Shimizu et al. |
| 2004/0023074 A1 | 2/2004 | Shimizu et al. |
| 2004/0035737 A1 | 2/2004 | Buitron et al. |
| 2004/0037005 A1 | 2/2004 | Osawa |
| 2004/0068862 A1 | 4/2004 | Buitron et al. |
| 2004/0069662 A1 | 4/2004 | Buitron et al. |
| 2004/0070092 A1 | 4/2004 | Buitron et al. |
| 2004/0070859 A1 | 4/2004 | Crofton et al. |
| 2004/0071535 A1 | 4/2004 | Crofton et al. |
| 2004/0072029 A1 | 4/2004 | Lowery et al. |
| 2004/0170870 A1 | 9/2004 | Yokoyama et al. |
| 2005/0003106 A1 | 1/2005 | Isozaki |
| 2005/0037140 A1 | 2/2005 | Sakawaki et al. |
| 2005/0042768 A1 | 2/2005 | Fredrick |
| 2005/0053724 A1 | 3/2005 | Lewis |
| 2005/0054267 A1 | 3/2005 | Wada et al. |
| 2005/0121839 A1 | 6/2005 | Fukushima et al. |
| 2005/0132958 A1 | 6/2005 | Leng et al. |

FOREIGN PATENT DOCUMENTS

| | | |
|---|---|---|
| EP | 0 192 244 | 2/1986 |
| EP | 0192244 | 6/1990 |
| EP | 0177073 | 9/1990 |
| EP | 7-263521 | 10/1995 |
| EP | 768704 | 4/1997 |
| EP | 0768704 | 4/1997 |
| JP | 60253078 | 12/1985 |
| JP | 63122527 | 5/1988 |
| JP | 04067333 | 3/1992 |
| JP | 05028533 | 2/1993 |
| JP | 06076384 | 3/1994 |
| JP | 6-150307 | 5/1994 |
| JP | 06203527 | 7/1994 |
| JP | 07235083 | 9/1995 |
| JP | 407263521 | 10/1995 |
| JP | 07296418 | 11/1995 |
| JP | 08249802 | 9/1996 |
| JP | 08273210 | 10/1996 |
| JP | 09259473 | 10/1997 |
| JP | 10228674 | 8/1998 |
| JP | 11265506 | 9/1999 |
| JP | 2000331456 | 11/2000 |
| JP | 2001232667 | 8/2001 |
| JP | 2001283469 | 10/2001 |
| JP | 2002216454 | 8/2002 |
| WO | 9836867 | 8/1998 |

OTHER PUBLICATIONS

Non-Final Office Action Mail Date Mar. 18, 2008; U.S. Appl. No. 11/332,689.

Final Office Action Mail Date Feb. 19, 2009; U.S. Appl. No. 11/332,689.

Pang et al. (Effects of NiP Sub-Seedlayer on CoCrPtTa/CoCrTa/CrTi/NiAl Thin Film Media for Glass Substrate) IEEE Transactions on Magnetics pp. 1494-1496 vol. 37 No. 4 Jul. 2001.

Mar. 12, 2005 Invitiation to Respond to Written Opinion from Intellectual Property Office to Singapore to Tan Jinhwee, Eunice & Lim Chooeng.

"Design of an active memory system for network applications"; Asthana, A.; Cravatts, M.; Krzyzanowski, P.; Memory Technology, Design and Testing, Aug. 8-9, 1994; p. 58-63.

U.S. 5,762,201; Jun. 1998, Whalen (withdrawn).

Tsingberg, M. Eggrs, C., "DVD technology"; Image Processing, 1998 ICIP 98 Proceedings. 1998 Int'l Conf on vol. 1; Oct. 4-7, 1998, p. 2: 2 vol. 1.

US 5,762,201, 06/1998, Whalen (withdrawn)

\* cited by examiner

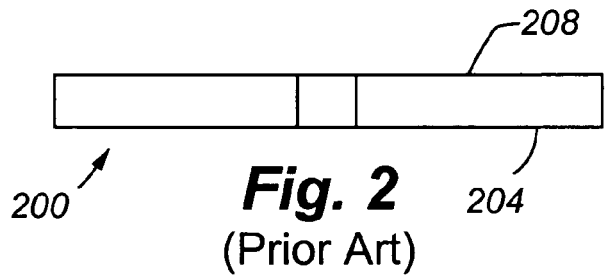
Fig. 2
(Prior Art)
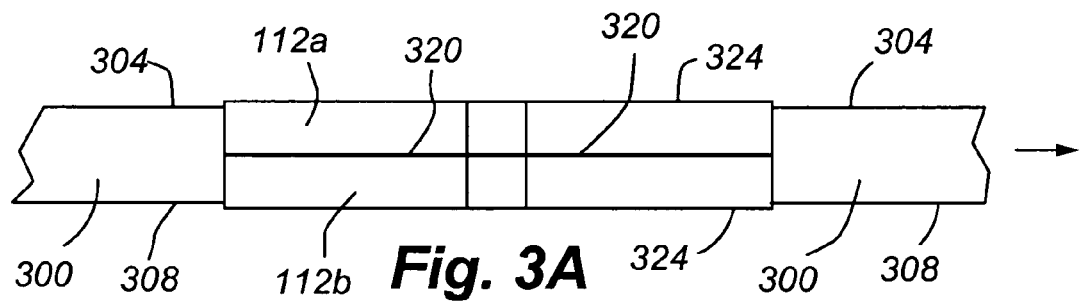
Fig. 3A
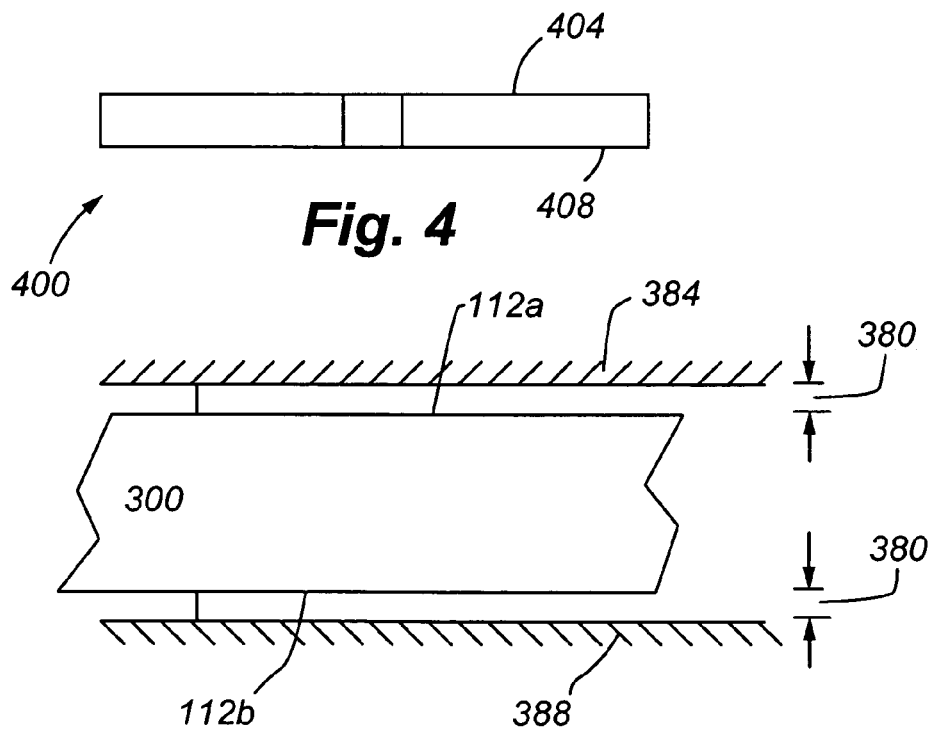
Fig. 4
Fig. 3B

MANUFACTURING SINGLE-SIDED STORAGE MEDIA

CROSS REFERENCE TO RELATED APPLICATION

The present application claims the benefits, under 35 U.S.C. §119(e), of U.S. Provisional Application Ser. No. 60/606,847 filed Sep. 2, 2004, of the same title, which is incorporated herein by this reference.

FIELD OF THE INVENTION

The present invention is related generally to recording media and specifically to single-sided magnetic recording media. This invention refers to single-sided magnetic recording media of all sizes and formats. The invention text refers to the thickness of 95 mm×50 mil recording media but encompasses other sizes, including but not limited to 95 mm×69 mil thick, 84 mm×50 mil thick, 48 mm×25 mil thick, 95 mm×31.5 mil thick, et al.

BACKGROUND OF THE INVENTION

Hard disk drives are an efficient and cost effective solution for data storage. Depending upon the requirements of the particular application, a disk drive may include anywhere from one to twelve hard disks and data may be stored on one or both surfaces of each disk. While hard disk drives are traditionally thought of as a component of a personal computer or as a network server, usage has expanded to include other storage applications such as set top boxes for recording and time shifting of television programs, personal digital assistants, cameras, music players and other consumer electronic devices, each having differing information-storage capacity requirements.

As aerial bit densities of hard disks have dramatically increased in recent years, the large data storage capacities of dual-sided magnetic storage media far exceed demand in many applications. For example, dual-sided hard disks in personal computers have much greater storage capacity than most consumers require during the useful life of the computer. Consumers thus are forced to pay substantial amounts for excess data storage capacity. The intense price competition in the magnetic storage media industry has forced many disk drive manufacturers to offer single-sided magnetic storage media as an alternative.

Single-sided storage media are of two types. In one type, a double-sided disk configured to store information on both sides of the disk is installed with a single read/write head serving only one side of the disk. In the other type, known as a single-sided processed disk, only one side of the disk is provided with an information-storage magnetic layer. The other side of the disk does not have or is free of an information-storage layer. Single-sided processed disks not only have sufficient storage capacities to satisfy most consumers, but also can be manufactured at lower costs than dual-sided disks due to reduced material usage.

One prior art process used for manufacturing single-sided processed disks is shown in FIG. 1. Referring to FIG. 1, a disc-shaped substrate blank 100, which is typically aluminum, is stamped out of a sheet of material. The substrate blank 100, in step 104, is annealed to a zero temper and the inner and outer diameters of the substrate blank cut to size using a single point lathe, such as a diamond lathe. For example, one common size is an outer diameter of about 95 mm and an inner diameter of about 25 mm. Chamfers are typically formed on the upper and lower substrate blank surfaces in this step. In step 108, the sized disk is surface machined using a diamond tool. This step removes excess material from both sides of the sized disk and provides a surface machined blank 112 having the desired approximate disk thickness. The surface machined blank 112 is washed and dried in steps 116 and 120, respectively. The surface machined blank 112 is then annealed to remove, at least partially, the effects of cold work from steps 104 and 112. In step 128, both sides of the disk are ground to produce a finished ground blank 132. The finished ground blank 132 is washed, dried, and inspected in steps 136, 140, and 144, respectively. The finished ground blank 132 is then plated in step 148 to provide a plated substrate blank 152. The plating step is performed by known techniques, such as by electroless plating techniques, and provides a layer of nickel phosphorus on each side of the plated substrate blank 152.

The plated substrate blank 152 is subjected to further processing 156. In one prior art process, the nickel phosphorus layer on a selected side of the plated substrate blank 152 is rough and fine polished. A disk holder contains compartments (or holes) for receiving two disks simultaneously (referred to as "two-at-a-time disk polishing"). Upper and lower polishing pads polish the outwardly facing surfaces of the adjacent stacked disks. The back-to-back contacting disk surfaces are not polished.

In following process steps, the plated disks are merged for processing, subjected to data zone texturing, washed to remove any debris or contaminants from the data zone texturing step, layer zone textured by known techniques followed by washing of the upper disk surfaces, subjected to sputtered deposition of an underlayer, magnetic layer, and overcoat layer, subjected to the application of a lubrication layer, and subjected to tape burnishing. "Merging" refers to placing the disks back-to-back such that the upper disk surfaces face outwardly. In other words, the lower disk surfaces are adjacent to one another. The disks can be contact merged in which case the lower disk surfaces of each disk physically contact one another or gap merged in which case the lower disk surfaces of each disk are separated by a gap. Finally, the adjacent disks are separated or demerged to provide the finished disk. With reference to FIG. 2, the lower side 204 of the disk 200 does not store information, while the upper side 208 of the disk 200 does.

Aspects of this process are further described in U.S. application Ser. Nos. 10/434,550, now U.S. Pat. No. 7,083,871, entitled "Single-Sided Sputtered Magnetic Recording Disks" to Kim et al.; 10/435,361, now U.S. Pat. No. 7,165,308, entitled "Dual Disk Transport Mechanism Processing Two Disks Titled Toward Each Other" to Grow et al.; 10/435,358, now U.S. Pat. No. 7,180,709, entitled "Information-Storage Media With Dissimilar Outer Diameter and/or Inner Diameter Chamfer Designs On Two Sides" to Kim et al.; 10/435,360, now U.S. Pat. No. 7,600,359, entitled "Method of Merging Two Disks Concentrically Without Gap Between Disks" to Buitron; 10/434,551, now U.S. Pat. No. 7,367,773, entitled "Apparatus for Combining or Separating Disk Pairs Simultaneously" to Buitron et al.; 10/435,572, now U.S. Pat. No. 7,322,098, entitled "Method of Simultaneous Two-Disk Processing of Single-Sided Magnetic Recording Disks" to Buitron et al.; 10/435,161, now U.S. Pat. No. 7,628,895, entitled "W-Patterned Tools for Transporting/Handling Pairs of Disks" to Buitron et al.; 10/435,295, now U.S. Pat. No. 7,027,246, entitled "Method for Servo Pattern Application on Single-Sided Processed Disks in a Merged State" to Valeri; 10/434,547, now U.S. Pat. No. 7,083,502, entitled "Method for Simultaneous Two-Disk Texturing" to Buitron et al.;

10/435,227, now U.S. Patent Application Pub. No. 2004/0069662, entitled "Cassette for Holding Disks of Multiple Form Factors" to Buitron et al.; 10/434,546, now U.S. Pat. No. 7,083,376, entitled "Automated Merge Nest for Pairs of Magnetic Storage Disks" to Crofton et al.; 10/435,293, now U.S. Patent Application Pub. No. 2004/0070859, entitled "Apparatus for Simultaneous Two-Disk Scrubbing and Washing" to Crofton et al.; 10/435,362, now U.S. Pat. No. 7,168,153, entitled "Method for Manufacturing Single-Sided Hard Memory Disks" to Buitron et al.; and 10/434,540, now U.S. Pat. No. 7,052,739, entitled "Method of Lubricating Multiple Magnetic Storage Disks in Close Proximity" to Buitron et al., all filed on May 9, 2003. Each of these applications is incorporated by reference in its entirety as if stated herein.

Notwithstanding the substantial cost savings provided by the above-described process, there remains a need for additional cost reductions in the highly competitive magnetic storage media industry.

SUMMARY OF THE INVENTION

These and other needs are addressed by the various embodiments and configurations of the present invention. The present invention is related generally to surface processing of magnetic storage media, particularly before the surfaces are plated.

In a first embodiment, a method for manufacturing a single-sided information-storage media is provided that includes the steps:

(a) providing first and second substrates, each substrate having first and second surfaces;

(b) placing the first surface of the first intermediate structure adjacent to the first surface of the second intermediate structure, such that the first and second intermediate structures are in a stacked relationship;

(c) simultaneously removing a portion of each of the second surfaces of the first and second intermediate structures while in the stacked relationship;

(d) forming a plating layer on each of the first and second layers of each of the first and second intermediate structures; and (e) thereafter forming a magnetic layer on the second surface but not the first surface of each of the first and second intermediate structures. In step (c), a portion of the first surfaces is typically not removed. As a result, the first surface has first degree of roughness that is greater than the second degree of roughness.

This embodiment uses two-at-a-time disk processing or merging techniques prior to plating of the blank. The active side of the disk is subjected to certain types of pre-plating surface processing while the inactive side is not. As used herein, "active side" and "inactive side" refer to the final finished disk configuration. Thus, the active side of the blank refers to the side that will be the active side (or information-containing or storing side) of the finished disk and the inactive side of the blank to the side that will be the inactive side (or the side that does not contain or store information) of the finished disk.

In another embodiment, a magnetic storage medium is provided that includes:

(a) a substrate having first and second surfaces;

(b) first and second plating layers on the first and second surfaces, respectively; and (c) a magnetic layer located adjacent to the second surface. The second surface has a roughness of no more than about 300% of the roughness of the first surface.

The manufacturing and magnetic disk described above can provide substantial cost benefits and price reductions. The use of single-side surface processing can double the grinding capacity for each processing unit, lower energy usage required to process each substrate, lower substrate processing time, and lower substrate costs. Unlike the prior art, the present invention can obviate the need to machine and grind both sides of the substrate to extremely tight tolerances and surface finishes.

These and other advantages will be apparent from the disclosure of the invention(s) contained herein.

The above-described embodiments and configurations are neither complete nor exhaustive. As will be appreciated, other embodiments of the invention are possible utilizing, alone or in combination, one or more of the features set forth above or described in detail below.

As used herein, "at least one," "one or more," and "and/or" are open-ended expressions that are both conjunctive and disjunctive in operation. For example, each of the expressions "at least one of A, B and C," "at least one of A, B, or C," "one or more of A, B, and C," "one or more of A, B, or C" and "A, B, and/or C" means A alone, B alone, C alone, A and B together, A and C together, B and C together, or A, B and C together.

BRIEF DESCRIPTION OF THE DRAWINGS

FIG. 2 is a cross-sectional view of a prior art finished ground blank taken along a vertical center plane of the blank;

FIG. 3 is a cross-sectional view of a pair of disk blanks in a holder according to an embodiment of the present invention;

FIG. 4 is a cross-sectional view of a disk blank according to an embodiment of the present invention taken along a vertical center plane of the disk blank;

DETAILED DESCRIPTION

With reference to FIG. 4, which depicts a finished ground blank 400 according to the present invention, the upper disk surface 404 (or the active side) is considerably smoother (or has a lower degree of roughness) than the lower disk surface 408 (or the inactive side). Surprisingly, it has been discovered that both the active and inactive sides may be plated effectively, notwithstanding a substantial difference in surface roughness between the two sides. There is thus no reason to surface process both sides to provide nearly or precisely identical degrees of surface roughness.

Different manufacturing processes may be used to produce the blank of FIG. 4.

Figure 5:
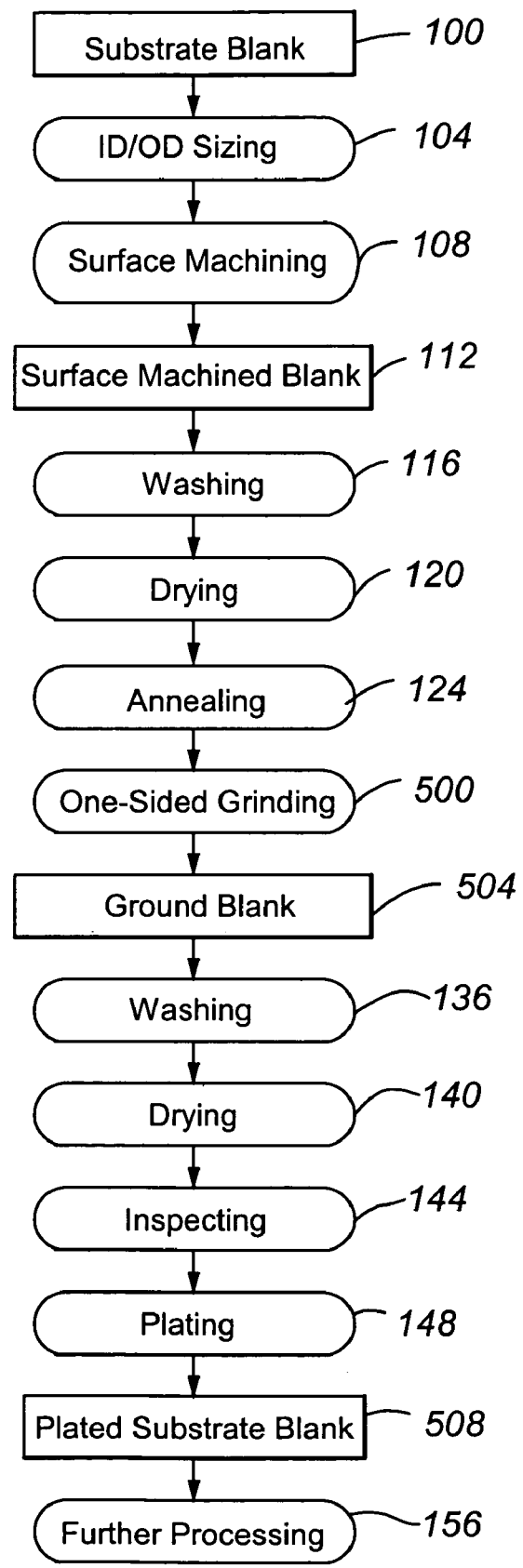
FIG. 5 is a plated substrate blank manufacturing process according to an embodiment of the present invention.

The manufacturing process of the first embodiment is shown in FIG. 5.

In step 500, the surface machined blank 112 is ground by a suitable grinding device, such as a planetary grinding machine, using two-at-a-time techniques. In other words, the blank 112 is merged with another blank 112 using either contact or gap merging techniques so that the exteriorly facing active sides of the blanks are subjected to grinding while the interiorly facing inactive sides are not. The merged assembly is shown in FIG. 3A.

Referring to FIG. 3A, first and second blanks 112a,b are contact merged in a holder 300. As can be seen from the FIGS. 3A and 3B, the active sides 324 of the blanks face outwardly and project slightly above the upper and lower surfaces 304 and 308 of the holder 300. As the holder 300 moves into the grinding step 500, this offset 380 permits the upper and lower plate/grinding pad assemblies 384 and 388 to contact the outwardly facing blank surfaces without hindrance from the holder 300. The offset 380 typically ranges from about 0.05 to about 0.25 mm. The inactive sides 320 are in physical contact with one another, though a gap may be positioned between the opposing sides.

The grinding of step 500 is rough grinding. As used herein, "rough grinding" refers to grinding of no more than about 30µ grit and more typically ranging from about 15µ to about 20µ grit. The grinding step 500 typically reduces the thickness of the surface machined blank 112 by from about 3.0 to about 4.0%. As will be appreciated, the initial thickness of the (as punched) substrate blank 100 ranges from 51 to about 53 mils; the thickness of the surface machined blank 112 from about 49 to about 50 mils; and the thickness of the finished substrate from about 49 to 51 mils. The grinding step 500 is typically performed for a time ranging from about 300 to about 600 seconds.

Following grinding, the ground blanks 504 are removed from the holder 300 and placed in a process cassette to maintain the ground or active side of the disk in a desired orientation. The surface machined and unground (inactive) side thus becomes the back side of the ground blank. The surface machined and ground (active) side thus becomes the front side of the ground blank.

In this embodiment, the degree of roughness of the active side 404 is no more than about 30% and even more typically ranges from about 20 to about 30% of the degree of roughness of the inactive side. Quantitatively, the roughness of the active side typically is no more than about 60 Å, more typically no more than about 45 Å, and even more typically ranges from about 40 Å to about 60 Å while the roughness of the inactive side typically is at least about 100 Å, more typically at least about 90 Å, and even more typically ranges from about 90 Å to about 110 Å.

Figure 6:
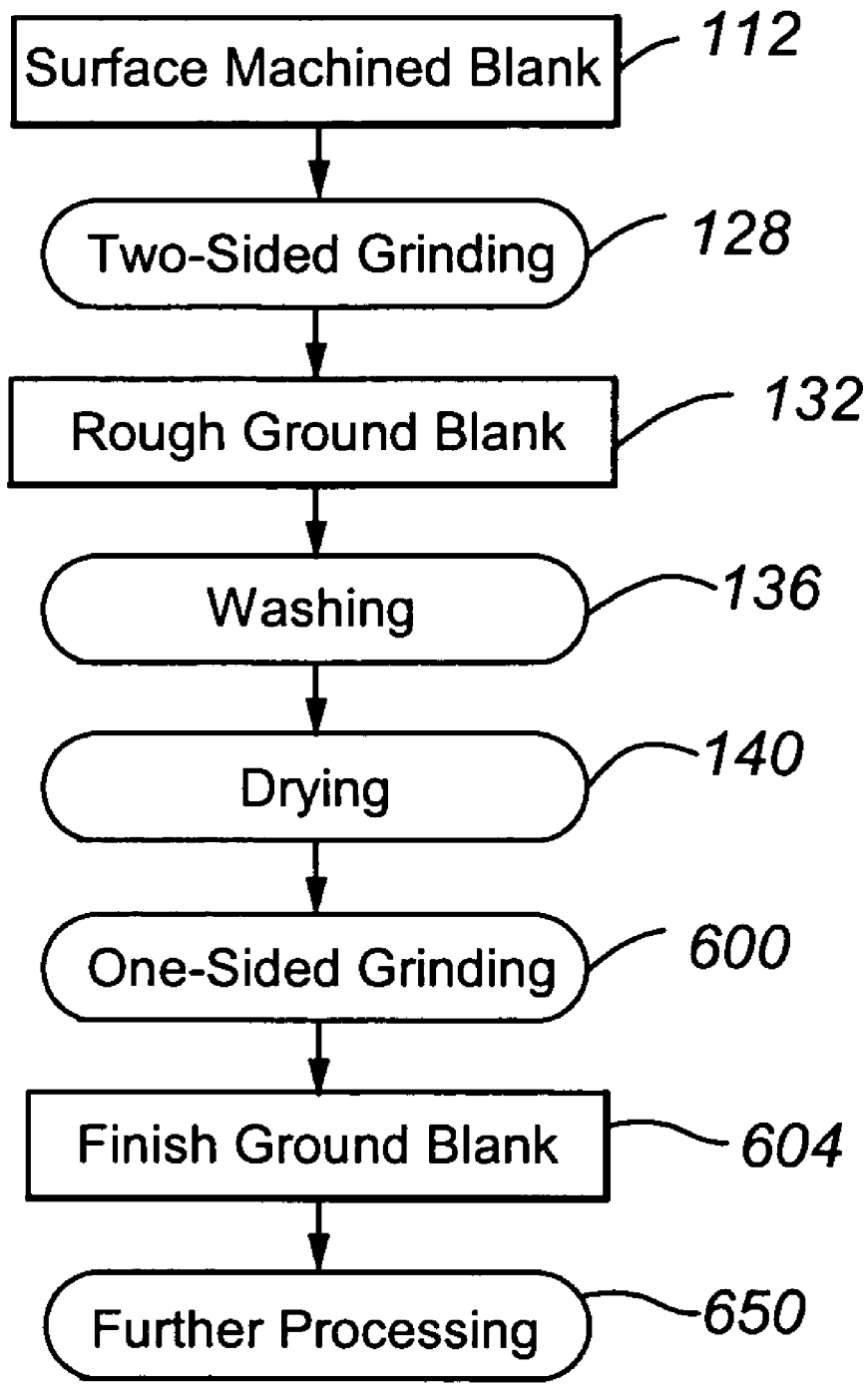
FIG. 6 is a plated substrate blank manufacturing process according to an embodiment of the present invention.

The manufacturing process of the second embodiment is shown in FIG. 6.

The process differs from the process of FIG. 5, in that a conventional (one-disk-at-a-time) rough grinding step 128 is employed but the fine grinding is performed by one-sided grinding techniques in step 600. As used herein, "fine grinding" refers to grinding of at least about 5µ grit and more typically ranging from about 4µ to about 6µ grit. The grinding step 600 is performed using the holder 300 with two rough ground blanks 132 being placed back-to-back in the holder 300. The grinding step 600 typically reduces the thickness of the rough ground blank 132 by an amount ranging from about 1 to about 3%.

The grinding step 600 is typically performed for a time ranging from about 100 to about 300 seconds.

Figure 1:
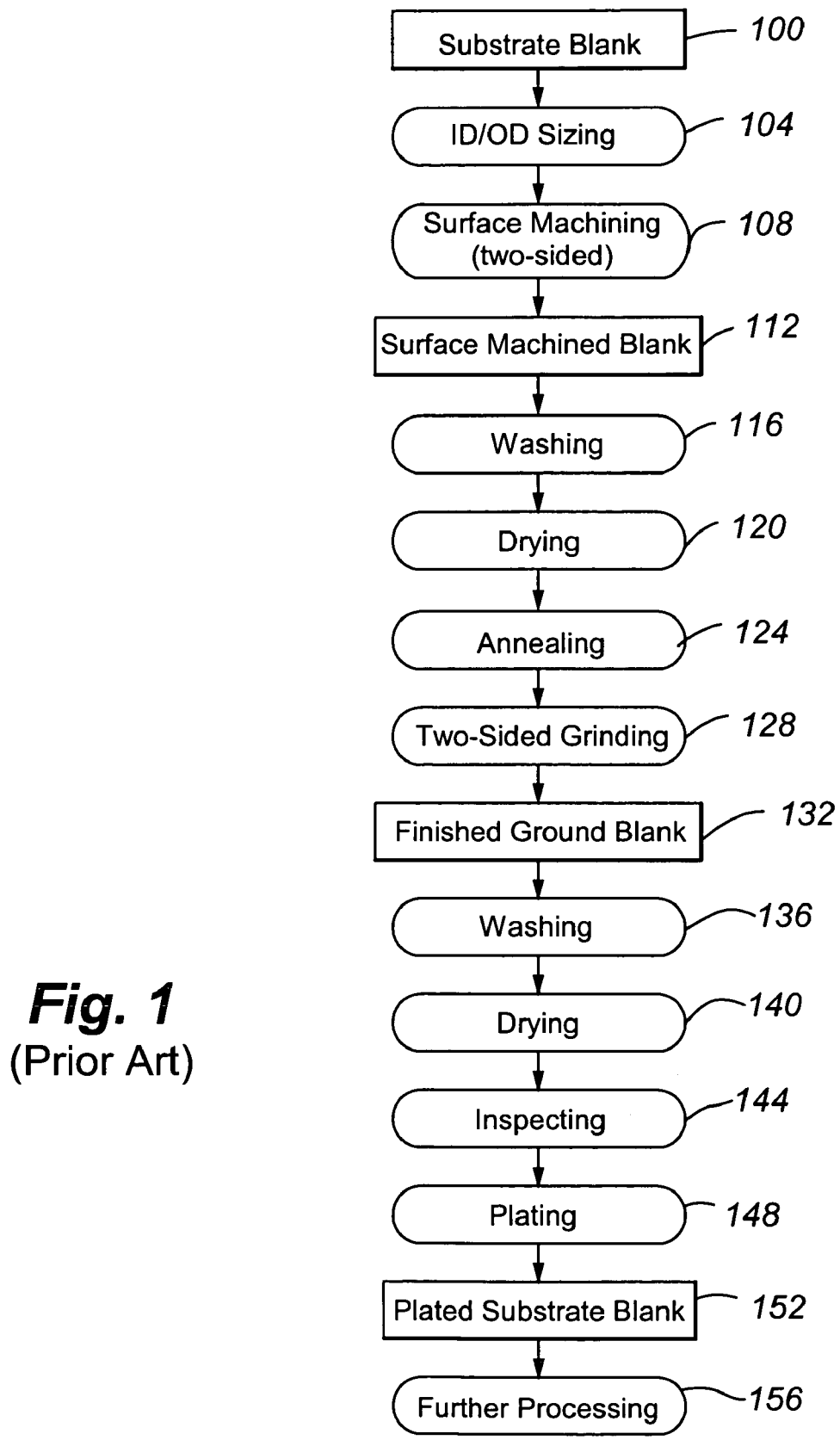
FIG. 1 is a prior art flowchart of a single-sided magnetic disk manufacturing process.

The active side of the finish ground blank 604 is surface machined, rough ground, and fine ground while the inactive side of the blank 604 is only surface machined and rough ground. The blank 604 is subjected to further processing (which includes not only the further processing steps 156 of FIG. 1, but also the plating step 148).

In this embodiment, the degree of roughness of the active side is no more than about 10% and even more typically ranges from about 5 to about 15% of the degree of roughness of the inactive side 408. Quantitatively, the roughness of the active side typically is no more than about 60 Å, more typically no more than about 45 Å, and even more typically ranges from about 40 Å to about 60 Å while the roughness of the inactive side typically is at least about 100 Å, more typically at least about 90 Å, and even more typically ranges from about 90 Å to about 110 Å.

Figure 7:
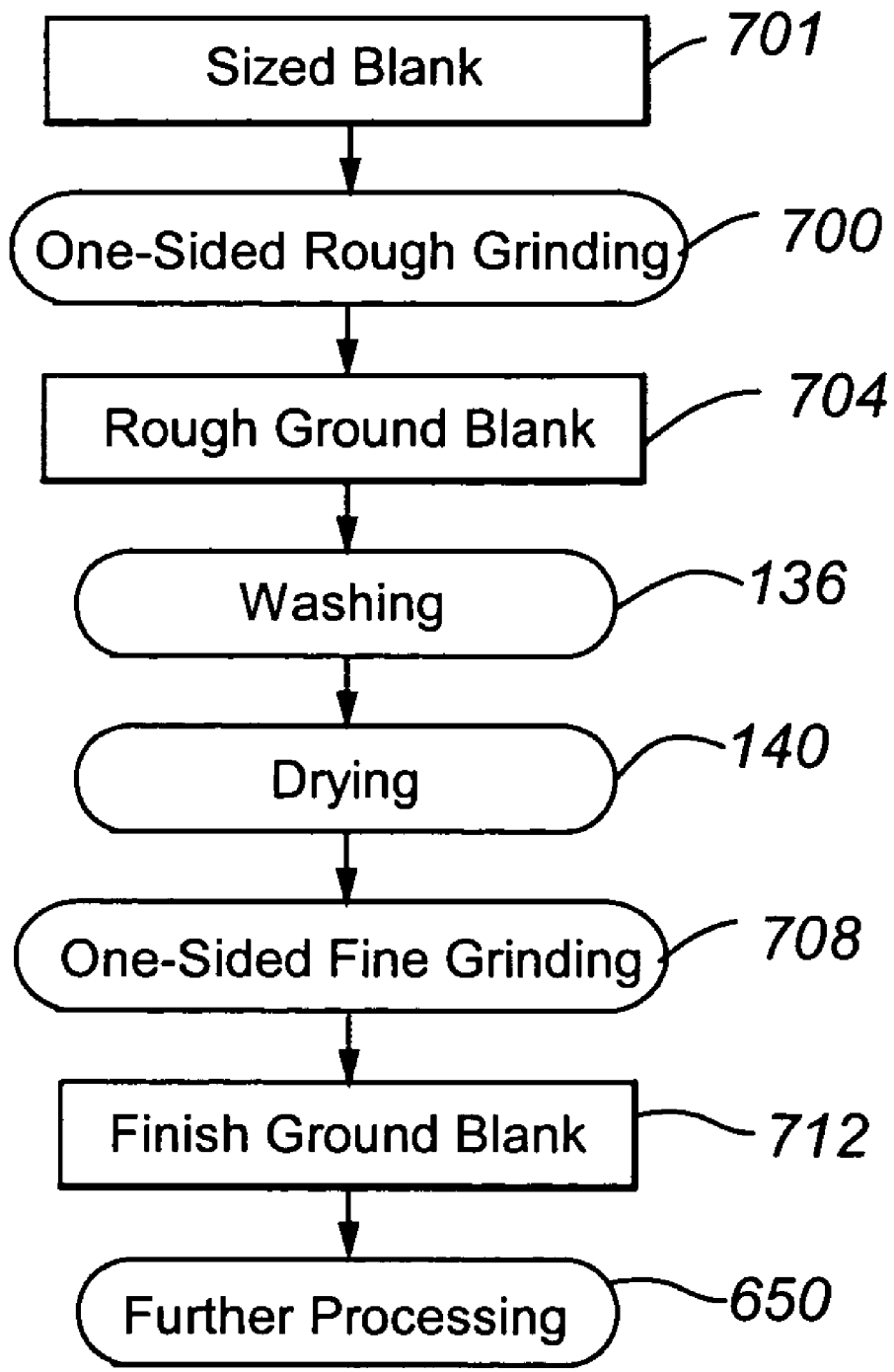
FIG. 7 is a plated substrate blank manufacturing process according to an embodiment of the present invention.

The manufacturing process of the third embodiment is shown in FIG. 7.

The process differs from the process of FIGS. 5 and 6, in that rough grinding and diamond turning of both sides of the blank are eliminated. The as-punched and sized blank 701 is rough and finished ground on only one (the active) side using two-at-a-time techniques. When completed, the unground and unturned side or inactive side becomes the lower side of the disk.

Referring now to FIG. 7, the sized blank 701 is merged along with another sized blank 701 in the holder 300 with the inactive sides of the blanks being adjacent to one another and facing inwardly and the active sides of the blanks facing outwardly in opposite directions from one another. The holder 300 is progressively moved through the rough grinding step 704, washing step 136, drying step 140, and fine groundling step 708.

The active side of the finish ground blank 712 is rough and fine ground while the inactive side of the blank 604 is only sized and is not rough ground. Neither side has been surface machined 108.

In this embodiment, the degree of roughness of the active side is no more than about 60% and even more typically ranges from about 50 to about 70% of the degree of roughness of the inactive side 408. Quantitatively, the roughness of the active side typically is no more than about 60 Å, more typically no more than about 45 Å, and even more typically ranges from about 40 Å to about 60 Å while the roughness of the inactive side typically is at least about 250 Å, more typically at least about 200 Å, and even more typically ranges from about 150 Å to about 250 Å.

Figure 8:
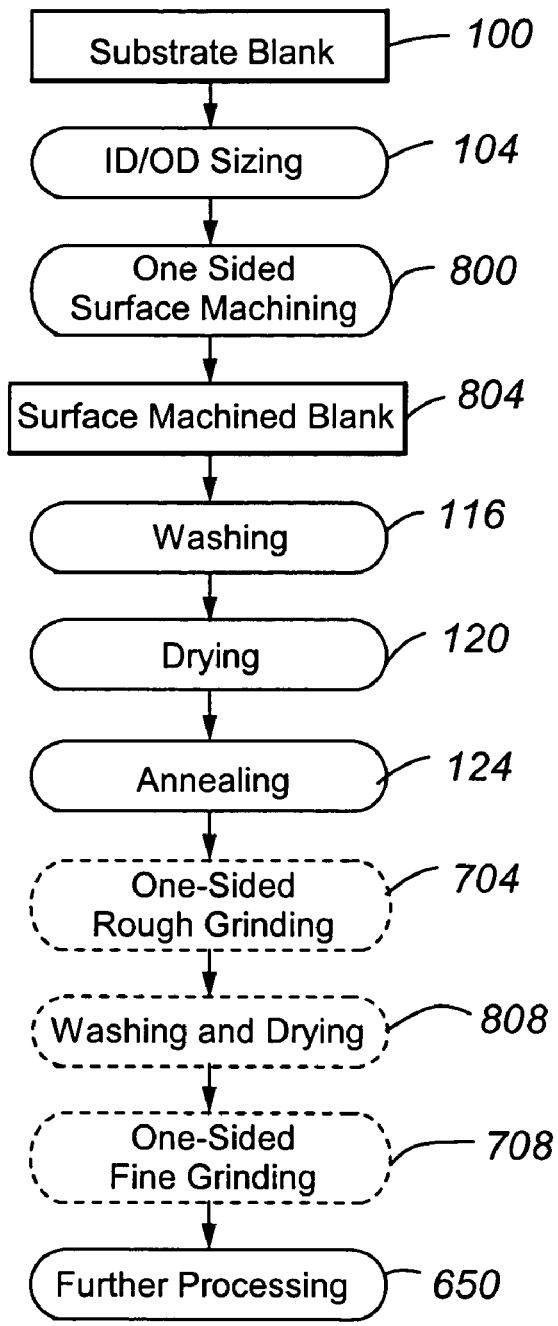
FIG. 8 is a plated substrate blank manufacturing process according to an embodiment of the present invention.

The manufacturing process of the fourth embodiment is shown in FIG. 8.

The process differs from the above processes in that only one (the active) side of the sized blank is surface machined and rough and/or fine ground. The inactive side is free of surface machining and rough and fine grinding. When completed, the unmachined and unground side, or inactive side, becomes the lower side of the disk.

Referring now to FIG. 8, the sized blank 701 is sized 104, and only one side of the sized blank is surface machined, such as by diamond turning. The surface machined blank 804 is washed 116, dried 120, and annealed 124. The blank is then optionally rough ground 704 by two-at-a-time techniques, optionally washed and dried 808, and optionally fine ground by two-at-a-time techniques. The holder 300 is typically used only in steps 800, 804, 116, 120, 124, 704, 808, and 708.

The active side of the finish ground blank is surface machined and/or rough and/or fine ground while the inactive side of the blank 604 is unfinished. Normally, the inactive is only sized and surface cleaned and is neither machine nor ground.

In this embodiment, the smooth active side is readily discernible from the rough inactive side. Preferably, the degree of roughness of the active side is no more than about 60% and even more typically ranges from about 50 to about 70% of the degree of roughness of the inactive side 408. Quantitatively, the roughness of the active side typically is no more than about 60 Å, more typically no more than about 45 Å, and even more typically ranges from about 40 Å to about 60 Å while the roughness of the inactive side typically is at least about 250 Å, more typically at least about 200 Å, and even more typically ranges from about 150 Å to about 250 Å.

In all of the processes, the blanks are not merged during plating so that a nickel phosphorus layer is applied both to the active and inactive sides of the blank. After plating, the blanks are merged as described above with reference to FIG. 1 and subjected to further processing 156 to provide the finished one-sided magnetic storage media.

Figure 9:
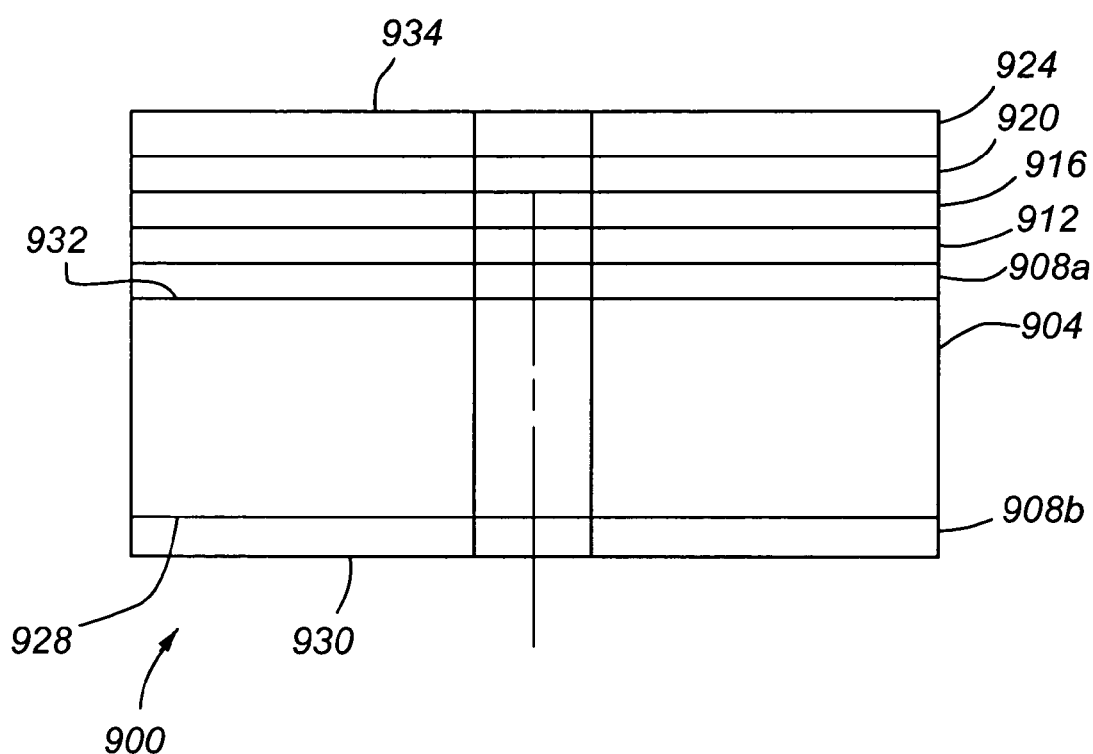
FIG. 9 is a cross-sectional view of a magnetic disk according to an embodiment of the present invention taken along a vertical center plane of the disk blank.

An embodiment of a magnetic disk produced by a process including one of the above embodiments is shown in FIG. 9. The disk, 900 (which is not drawn to scale) includes the substrate (or finished ground blank) 904, upper and lower plating layers 908a,b, an underlayer 912, an information-containing structure 916 typically including one or more magnetic and non-magnetic layers, an overcoat layer 920, and a lubricant layer 924. As will be appreciated, the substrate 904 can be any suitable material, such as aluminum, aluminum alloys (e.g., AlMg), glass, ceramic materials, titanium, titanium alloys and/or graphite. A particularly preferred material is a 5000 series aluminum alloy designated as 5D86 (which is an alloy of aluminum and magnesium). The plating layers 908a,b can be any suitable material for achieving acceptable magnetic recording properties in the overlying magnetic layer(s), such as iron oxide, nickel phosphorus, nickel molybdenum phosphorus, and nickel antimony phosphorus, with the latter three materials being preferred. The underlayer 912 can be any material capable of providing the desired crystallography in the information-containing structure 916. Preferably, the underlayer 912 is chromium or a chromium alloy. The structure 916 typically includes one or more magnetic layers that can be any ferromagnetic material, with the cobalt-platinum-based quaternary alloy having the formula CoPtXY or the five element alloy CoPtXYZ, wherein XY and Z can be tantalum, chromium, boron, nickel, or copper. Nonmagnetic layer(s), such as chrome or ruthenium, can be positioned between multiple magnetic layers. The overcoat layer 920 can be any suitable overcoat material, with carbon being preferred, and the lubricant layer 924 can be any suitable material (such as a perfluoropolyether). As noted previously, the roughness of the surface 928 on the inactive side 930 is greater than the roughness of the surface 932 on the active side 934 of the disk 900.

A number of variations and modifications of the invention can be used. It would be possible to provide for some features of the invention without providing others.

For example in one alternative embodiment, the planetary grinder used in the grinding steps is replaced with a single high speed unit that uses a grind wheel or a continuous abrasive web resulting in a finished ground blank.

The present invention, in various embodiments, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, includes providing devices and processes in the absence of items not depicted and/or described herein or in various embodiments hereof, including in the absence of such items as may have been used in previous devices or processes, e.g., for improving performance, achieving ease and\or reducing cost of implementation.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments for the purpose of streamlining the disclosure. This method of disclosure is not to be interpreted as reflecting an intention that the claimed invention requires more features than are expressly recited in each claim. Rather, as the following claims reflect, inventive aspects lie in less than all features of a single foregoing disclosed embodiment. Thus, the following claims are hereby incorporated into this Detailed Description, with each claim standing on its own as a separate preferred embodiment of the invention.

Moreover, though the description of the invention has included description of one or more embodiments and certain variations and modifications, other variations and modifications are within the scope of the invention, e.g., as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A method comprising:
    (a) providing first and second intermediate structures, each intermediate structure having first and second surfaces;
    (b) placing the first surface of the first intermediate structure adjacent to the first surface of the second intermediate structure, such that the first and second intermediate structures are in a stacked relationship;
    (c) simultaneously removing at least a portion of each of the second surfaces of the first and second intermediate structures while in the stacked relationship resulting in the first surface in each of the first and second intermediate structures having a first degree of roughness that is greater than a second degree of roughness of the second surface of each of the first and second intermediate structures;
    (d) after the simultaneously removing, forming a plating layer on each of the first and second surfaces of each of the first and second intermediate structures; and
    (e) after the simultaneously removing, forming a magnetic layer on the second surface but not the first surface of each of the first and second intermediate structures.

2. The method of claim 1, wherein, in (b), the first and second intermediate structures are one of contact and gap merged in a holder.

3. The method of claim 2, wherein each of the outwardly facing second surfaces of each of the first and second intermediate structures are offset outwardly from an adjacent surface of the holder, whereby an abrasive surface contacts the corresponding second surface without contacting the adjacent holder surface.

4. The method of claim 1, wherein the providing step (a) comprises the substep:
    (a1) surface machining the first and second surfaces of the first and second intermediate structures; and wherein, in the simultaneously removing step (c), each of the second surfaces are contacted with an abrasive surface having a grit size of no more than about 5μ.

5. The method of claim 4, wherein the first degree of roughness is at least about 40 Å, and the second degree of roughness is no more than about 60 Å.

6. The method of claim 4, wherein the second degree of roughness is no more than about 10% of the first degree of roughness.

7. The method of claim 1, wherein the providing step (a) comprises the substep:
- (a1) surface machining the first and second surfaces of the first and second intermediate structures; and wherein, in the simultaneously removing step (c), each of the second surfaces are contacted with an abrasive surface having a grit size of at least about 20μ.

8. The method of claim 7, wherein the first degree of roughness is at least about 10%, and the second degree of roughness is no more than about 30%.

9. The method of claim 7, wherein the second degree of roughness is no more than about 30% of the first degree of roughness.

10. The method of claim 1, wherein the first and second intermediate structures are free of surface machining and wherein (c) comprises:
- (c1) first contacting each of the second surfaces but not the first surfaces with an abrasive surface having a grit size of no more than about 20μ; and
- (c2) second contacting each of the second surfaces but not the first surfaces with an abrasive surface having a grit size of at least about 5μ.

11. The method of claim 10, wherein the first degree of roughness is at least about 200 Å, and the second degree of roughness is no more than about 60 Å.

12. The method of claim 10, wherein the second degree of roughness is no more than about 70% of the first degree of roughness.

13. The method of claim 1, wherein at least one of the following is performed:
- (a1) surface machining the second surface but not the first surface of the first and second intermediate structures;
- (c1) contacting each of the second surfaces but not the first surfaces with an abrasive surface having a grit size of no more than about 20μ; and
- (c2) contacting each of the second surfaces but not the first surfaces with an abrasive surface having a grit size of at least about 5μ.

14. The method of claim 13, wherein steps (a1) and (c2) are performed.

15. The method of claim 13, wherein (a1) and (c1) are performed.

16. The method of claim 13, wherein the first degree of roughness is at least about 200 Å, and the second degree of roughness is no more than about 60 Å.

17. The method of claim 13, wherein the second degree of roughness is no more than about 70% of the first degree of roughness.

18. A method comprising:
- arranging first and second intermediate structures in a facing relationship, each intermediate structure comprising first and second sides, the facing relationship comprises the first side of the first intermediate structure facing the first side of the second intermediate structure;
- removing material simultaneously from each of the second sides of said first and second intermediate structures while in said facing relationship;
- after the removing, depositing a metal layer over each of the first and second sides of each of the first and second intermediate structures; and
- after the removing, depositing a magnetic material over the second side but not the first side of each of the first and second intermediate structures.

19. A method comprising:
- positioning first and second intermediate structures in a stacked relationship, each intermediate structure having first and second surfaces;
- simultaneously removing material from each of the second surfaces of the first and second intermediate structures while in the stacked relationship;
- after the simultaneously removing, plating a metal layer over each of the first and second surfaces of each of the first and second intermediate structures; and
- after the simultaneously removing, depositing a magnetic material over the metal layer that is over the second surfaces but not over the first surfaces of the first and second intermediate structures.

* * * * *